Figure 1:
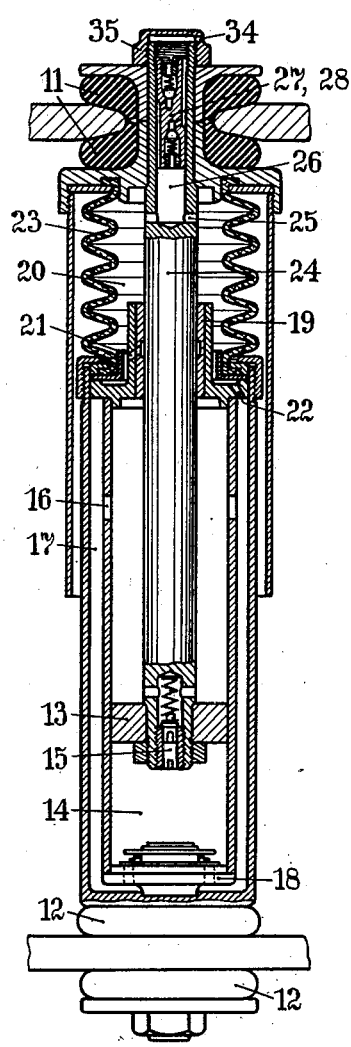

June 20, 1939. R. BINDER ET AL 2,163,255
HYDRAULIC SHOCK ABSORBER OF THE PISTON AND CYLINDER TYPE
Filed Sept. 26, 1938

Inventors
Richard Binder
and
Hermann Klein
by
Dean Fairbank & Hirsch
Attys

Patented June 20, 1939

2,163,255

UNITED STATES PATENT OFFICE 2,163,255

HYDRAULIC SHOCK ABSORBER OF THE PISTON AND CYLINDER TYPE

Richard Binder and Hermann Klein, Schweinfurt Germany

Application September 26, 1938, Serial No. 231,701
In Germany April 2, 1938

6 Claims. (Cl. 188—88)

Our invention relates to improvements in hydraulic shock-absorbers of the piston and cylinder type.

In the case of direct-acting hydraulic shock-absorbers it is particularly important that the portion of the piston rod extending from the cylinder should be protected against dirt and weather influences. For that purpose the piston rod is enclosed in a jacket or protective sleeve in the form of bellows of rubber, impregnated leather or the like. The protective sleeve, however, can only perfectly fulfil its function if it is so fixed in position as to be airtight, thereby requiring that the air enclosed by the protective sleeve, when the shock-absorber is working, be alternately compressed and expanded. So long as the movements of the piston rod do not exceed those occasioned by the normal spring suspension play of a vehicle, the strain exerted upon the protective sleeve by the changes in pressure of the air enclosed is only slight. But the working position of the shock-absorber varies further with the weight of the load carried by the vehicle; that is to say, the shock-absorber, when for example the vehicle is carrying a full load, oscillates to approximately the full extent of its stroke, and when the vehicle is empty, only to its minimum. This variation in load in most cases involves an alteration in the length of the protective sleeve essentially greater than can be caused by the suspension play alone. The pressure-variations in the enclosed air thus arising would therefore give rise to undue strain upon the protective sleeve.

It is the object of the invention to provide for means in the form of an equalizing device which prevents undue strain in this respect by utilizing the outside atmospheric pressure to compensate an excess or deficiency of pressure inside the protective sleeve, yet at the same time is so compensated or adjustable as to react only to the bigger variations in pressure resulting from differences in load of the vehicle when stationary. The movement then occasioned is slow, and corresponds to the degree to which the vehicle is loaded or free of load. When the vehicle is in motion, on the other hand, the movements imparted to the shock-absorber are considerably quicker. Were compensation to be provided between the air pressure inside and outside the protective sleeve in that contingency, the speed with which the ingress or egress of air took place would at the same time easily lead on the one hand to water or dirt being introduced into the interior of the protective sleeve, or, on the other, to some of the shock-absorber pressure-liquid, which escapes from the piston rod bearing but which normally flows back into the storage-container, being blown off into the air and wasted.

Our invention accordingly consists in that between the interior of the tightened protective sleeve and the outer air there are arranged spring loaded equalizing valves which, when the pressure in the protective sleeve exceeds a predetermined super-atmospheric value, permit air to escape from said sleeve to relieve the excessive pressure, and when the pressure in said sleeve falls below a predetermined sub-atmospheric value let air thereinto.

A further feature of the invention consists in that both valves are enclosed together in a common valve body, which is disposed in such a manner within the shock-absorber while mounted in operating position on the vehicle, that it can be removed, for the purpose of adjusting the valve springs, from its bored seating in the upper end of the piston rod.

We prefer to make the valves as ball valves, with their spring tension adjustable by means of tube nuts that can be screwed or unscrewed in their respective bores, with their seats lying opposite each other in approximately the same axis as the cylindrical valve body, which screws into the piston rod's longitudinal bore communicating with the interior of the protective sleeve.

In the accompanying drawing one form of construction of the device in accordance with the invention is shown by way of example.

Figure 2:
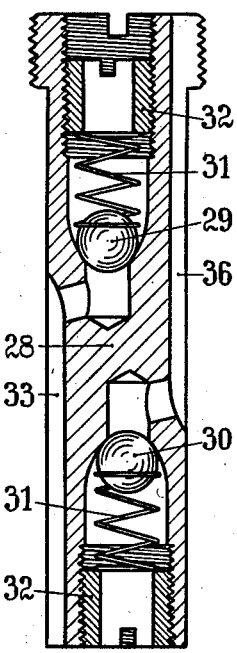

Fig. 1 represents a direct-acting hydraulic shock-absorber in longitudinal section fitted with the equalizing device. Fig. 2 shows the equalizing device on a larger scale, also in longitudinal section.

The shock-absorber is provided near opposite ends with elastic bearings 11 and 12. In one specific form of vehicle mounting, the bearings 11 are connected to the fixed part of the vehicle, while the bearings 12 are secured to the mountings, which carry the carriage, and which are spring supported for vertical oscillatory movement with respect to said fixed part. When the carriage is loaded downwardly, the resulting downward movement thereof is transmitted to the bearings 12, to cause corresponding downward movement of said bearings with respect to the bearings 11.

Fig. 1 shows the parts of the shock-absorber in the positions in which they are mutually when the vehicle is not loaded. The piston 13 in this case stands near the lower end of the cylinder 14. When the vehicle is travelling, the piston will oscillate up and down from this position according to the spring suspension play of the vehicle. When the vehicle is fully loaded, the piston oscillates in the neighborhood of the upper end of the cylinder. The liquid that damps the shock gets forced by the motion of the piston in the manner known through the high-pressure valve 15 and is returned via ducts 16, the storage-container 17 and the feed valve 18. Such small quantities of the shock-damping liquid as may penetrate through the piston guideway 19 into the space 20, can flow back into the storage-container 17 through the ducts 21, 22. The space 20 is hermetically enclosed by the protective sleeve 23 and protects that portion of the piston rod 24 which is situated outside the cylinder 14, as well as the piston rod guide-way 19. In the upper end of the piston rod 24 there are arranged ducts 25 and a bore 26, via which the interior of the protective sleeve communicates with the outer air. Inside this bore 26 is the equalizing device 27 in accordance with the invention.

As may be seen from Fig. 2, the equalizing device consists of the valve body 28, in which two valves 29, 30 are arranged reversely to each other. These valves, which, preferably, have the form of ball valves, are kept normally closed by the action of their springs 31. The tension of the springs is adjusted for example by means of tube nuts 32, thus allowing the tension to be adjusted within wide limits to any degree desired. Above a predetermined super-atmospheric pressure, air from the interior of the protective sleeve can escape via duct 33 and the valve 29, as well as through the boring 34 in the protecting cap 35 (Fig. 1), and in the contrary case be sucked in via duct 36 and the valve 30.

On taking off the cap 35 the valve body 28 containing the two valves 29, 30 can be easily removed from the bore 26 for the purpose of adjusting valve springs 31, without the shock-absorber having to be dismounted from the vehicle.

The feed ducts 33 and 36 of both valves have the major portion of their length arranged parallel to the valve bores of the valve opposite, and preferably in the surface-casing of the valve body.

While we have described our invention in detail in order that it may be properly understood, we do not desire to limit ourselves to the details of construction so described. On the contrary, we desire to claim, broadly, means for equalizing pressure in the protective sleeve of the piston rod of hydraulic shock absorbers of the type described. Therefore in particular respects the construction of the equalizing device can deviate from the mode described and shown in the example, without departing from the essential scope of the invention.

Having thus described our invention, what we claim as new, and desire to secure by Letters Patent, is—

1. In a hydraulic shock-absorber of the piston and cylinder type, in combination a protective sleeve of yieldable material surrounding the portion of the piston rod projecting out of the cylinder, said sleeve being secured at one end for movement with the cylinder, and secured at its other end for movement with said piston rod, and valve means for relieving the pressure of the air in said sleeve to the atmosphere when the pressure therein exceeds a predetermined amount, and for permitting air from the atmosphere to enter said sleeve when the pressure therein falls below a predetermined amount.

2. In a hydraulic shock-absorber of the piston and cylinder type, in combination a protective sleeve of yieldable material surrounding the portion of the piston rod projecting out of the cylinder, said sleeve being secured at one end for movement with the cylinder, and secured at its other end for movement with said piston rod, and valve means disposed in a longitudinal bore in the outer end of said piston rod, for relieving the pressure of the air in said sleeve to the atmosphere when the pressure therein exceeds a predetermined amount, and for permitting air from the atmosphere to enter said sleeve when the pressure therein falls below a predetermined amount.

3. In a hydraulic shock-absorber of the piston and cylinder type, in combination a protective sleeve of yieldable material surrounding the portion of the piston rod projecting out of the cylinder, said sleeve being secured at one end for movement with the cylinder, and secured at its other end for movement with said piston rod, and valve means for relieving the pressure of the air in said sleeve to the atmosphere when the pressure therein exceeds a predetermined amount, and for permitting air from the atmosphere to enter said sleeve when the pressure therein falls below a predetermined amount, said valve means including a pair of spring-pressed valves, joined in a common valve body, which is mounted in a longitudinal bore in the outer end of said piston rod, the valve springs being adjustable, and said valve body being removable from said bore, to permit adjustment of said springs.

4. In a hydraulic shock-absorber of the piston and cylinder type, in combination a protective sleeve of yieldable material surrounding the portion of the piston rod projecting out of the cylinder, said sleeve being secured at one end for movement with the cylinder, and secured at its other end for movement with said piston rod, and valve means for relieving the pressure of the air in said sleeve to the atmosphere when the pressure therein exceeds a predetermined amount, and for permitting air from the atmosphere to enter said sleeve when the pressure therein falls below a predetermined amount, said valve means including a pair of spring-pressed ball valves, mounted in a common valve body, detachably secured in a longitudinal bore in the upper end of said piston rod, communicating near one end with the outside air and near the other end with the interior of said sleeve, and nuts threaded in said valve body for adjusting the tension of the valve springs.

5. In a hydraulic shock-absorber of the piston and cylinder type, in combination a protective sleeve of yieldable material surrounding the portion of the piston rod projecting out of the cylinder, said sleeve being secured at one end for movement with the cylinder, and secured at its other end for movement with said piston rod, a valve in a longitudinal bore of said rod for relieving the pressure of the air in said sleeve to the atmosphere when the pressure therein exceeds a predetermined super-atmospheric amount, and having a feed duct with its major portion extending lengthwise of said rod, and communicating at one end with the inlet side of said valve, and at the other end with the pressure in said sleeve, and a second valve also in said bore for permitting air from the atmosphere to enter said sleeve when the pressure in said sleeve falls below a predetermined sub-atmospheric amount, and having a feed duct with the major portion extending lengthwise of said rod, and communicating at one end with the inlet side of said second valve and at its other end with the atmospheric pressure.

6. In a hydraulic shock-absorber of the piston and cylinder type, in combination a protective sleeve of yieldable material surrounding the portion of the piston rod projecting out of the cylinder, said sleeve being secured at one end for movement with the cylinder, and secured at its other end for movement with said piston rod, and valve means for relieving the pressure of the air in said sleeve to the atmosphere when the pressure therein exceeds a predetermined amount, and for permitting air from the atmosphere to enter said sleeve when the pressure therein falls below a predetermined amount, said valve means including a valve body mounted in a longitudinal bore in the outer end of said piston rod, and presenting a pair of substantially co-axial valve seats arranged in reverse relationship, valve members cooperating respectively with said seats, and feed ducts extending into the respective inlet sides of said valve members, and having their major portions extending parallel to the axis of said valve body.

RICHARD BINDER.
HERMANN KLEIN.